United States Patent
Zeng et al.

(10) Patent No.: US 8,611,102 B2
(45) Date of Patent: Dec. 17, 2013

(54) COMPUTING DEVICE WITH INDEPENDENT DUAL CPUS

(75) Inventors: Biao Zeng, Shenzhen (CN); Zhi-Guo Zhang, Shenzhen (CN); Yuan-Ting Guo, Wuhan (CN); Li-Fu Xu, Shenzhen (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 239 days.

(21) Appl. No.: 13/219,796

(22) Filed: Aug. 29, 2011

(65) Prior Publication Data

US 2012/0215956 A1 Aug. 23, 2012

(30) Foreign Application Priority Data

Feb. 21, 2011 (CN) .......................... 2011 1 0042559

(51) Int. Cl.
*H01K 1/14* (2006.01)
*G06F 1/16* (2006.01)
*H05K 7/02* (2006.01)
*H05K 7/10* (2006.01)

(52) U.S. Cl.
USPC ...... 361/785; 710/301; 361/679.07; 361/807; 361/809; 361/810

(58) Field of Classification Search
USPC .......................................................... 710/301
See application file for complete search history.

(56) References Cited

U.S. PATENT DOCUMENTS

| | | | | |
|---|---|---|---|---|
| 5,117,331 A | * | 5/1992 | Gebara | 361/775 |
| 5,963,431 A | * | 10/1999 | Stancil | 361/803 |
| 5,963,681 A | * | 10/1999 | Clements | 385/14 |
| 6,046,912 A | * | 4/2000 | Leman | 361/784 |
| 2004/0257786 A1 | * | 12/2004 | Murasawa | 361/810 |
| 2008/0301346 A1 | * | 12/2008 | Wu et al. | 710/301 |

* cited by examiner

*Primary Examiner* — Jayprakash N Gandhi
*Assistant Examiner* — Dion Ferguson
(74) *Attorney, Agent, or Firm* — Altis Law Group, Inc.

(57) ABSTRACT

A computing device includes a first motherboard and a second motherboard perpendicularly attached to the first motherboard. The first motherboard includes a first CPU module and a plurality of first peripheral component interconnect (PCI) sockets. The second motherboard includes a second CPU module and a plurality of second PCI sockets. The plurality of first PCI sockets is located perpendicularly to both motherboards. The plurality of second PCI sockets includes at least one PCI socket that is obliquely oriented relative to the first motherboard.

13 Claims, 4 Drawing Sheets

COMPUTING DEVICE WITH INDEPENDENT DUAL CPUS

BACKGROUND

1. Technical Field

The present disclosure relates to a computing device with one or more motherboards.

2. Description of Related Art

To enhance the performance of a computing device, the computing device requires to use dual central processing units (CPUs). The dual CPUs can deal with multiple applications simultaneously at a quicker rate. However, computing devices typically do not have space for installing more than one motherboard. The dual CPUs take too much space on the motherboard, the motherboard has to be sized larger, and the layout of the motherboard becomes more complicated. Further, the dual CPUs always be working together even if only one of them is needed.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation. In the figures of the accompanying drawings in which like references indicate similar elements. It should be noted that references to "an" or "one" embodiment in this disclosure are not necessarily to the same embodiment, and such references mean at least one.

Figure 1:
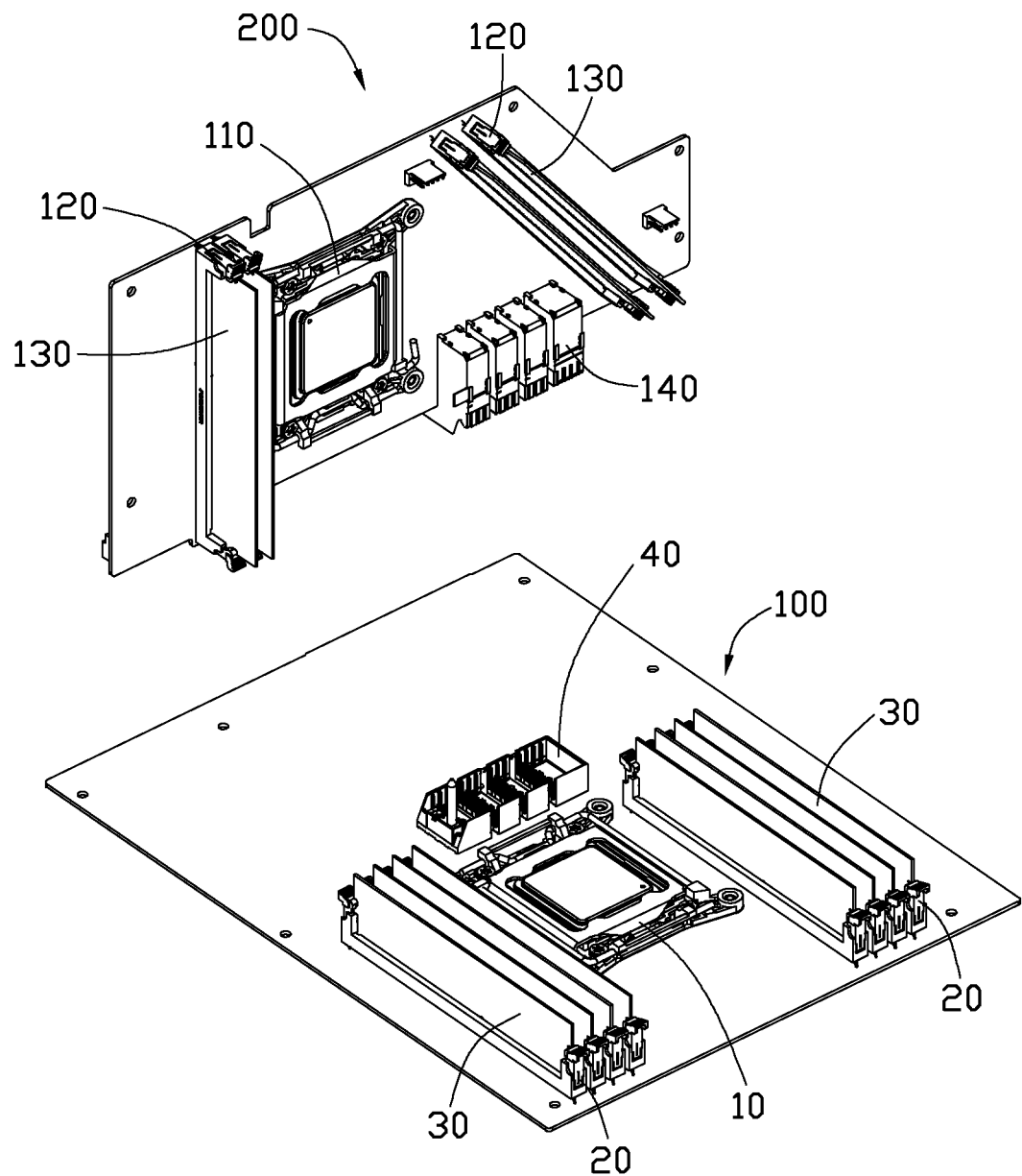
FIG. 1 is an exploded view of a computing device according to an embodiment.

Referring to FIG. 1, an embodiment of a computing device includes a first motherboard 100 and a second motherboard 200. The first motherboard 100 includes a first CPU module 10, a plurality of first peripheral component interconnect (PCI) sockets 20, a plurality of first PCI cards 30 attached to the plurality of first PCI sockets 20, and a plurality of master connectors 40 adapted to connect to the second motherboard 200. The first motherboard 100 has a rectangular or square shape. The plurality of first PCI sockets 20 includes two groups of PCI sockets arranged at opposite sides of the first CPU module 10. Each of the plurality of first PCI sockets 20 is located parallel to an edge of the first motherboard 100. The second motherboard 200 includes a second CPU module 110, a plurality of second PCI sockets 120, a plurality of second PCI cards 130 attached to the plurality of second PCI sockets 120, and a plurality of slave connectors 140 adapted to connect to the plurality of master connectors 40. A first group of the plurality of second PCI sockets 120 is located obliquely relative to an edge of the second motherboard 200. A second group of the plurality of second PCI sockets 120 is located perpendicular to the lengthwise edge of the second motherboard 200.

Figure 2:
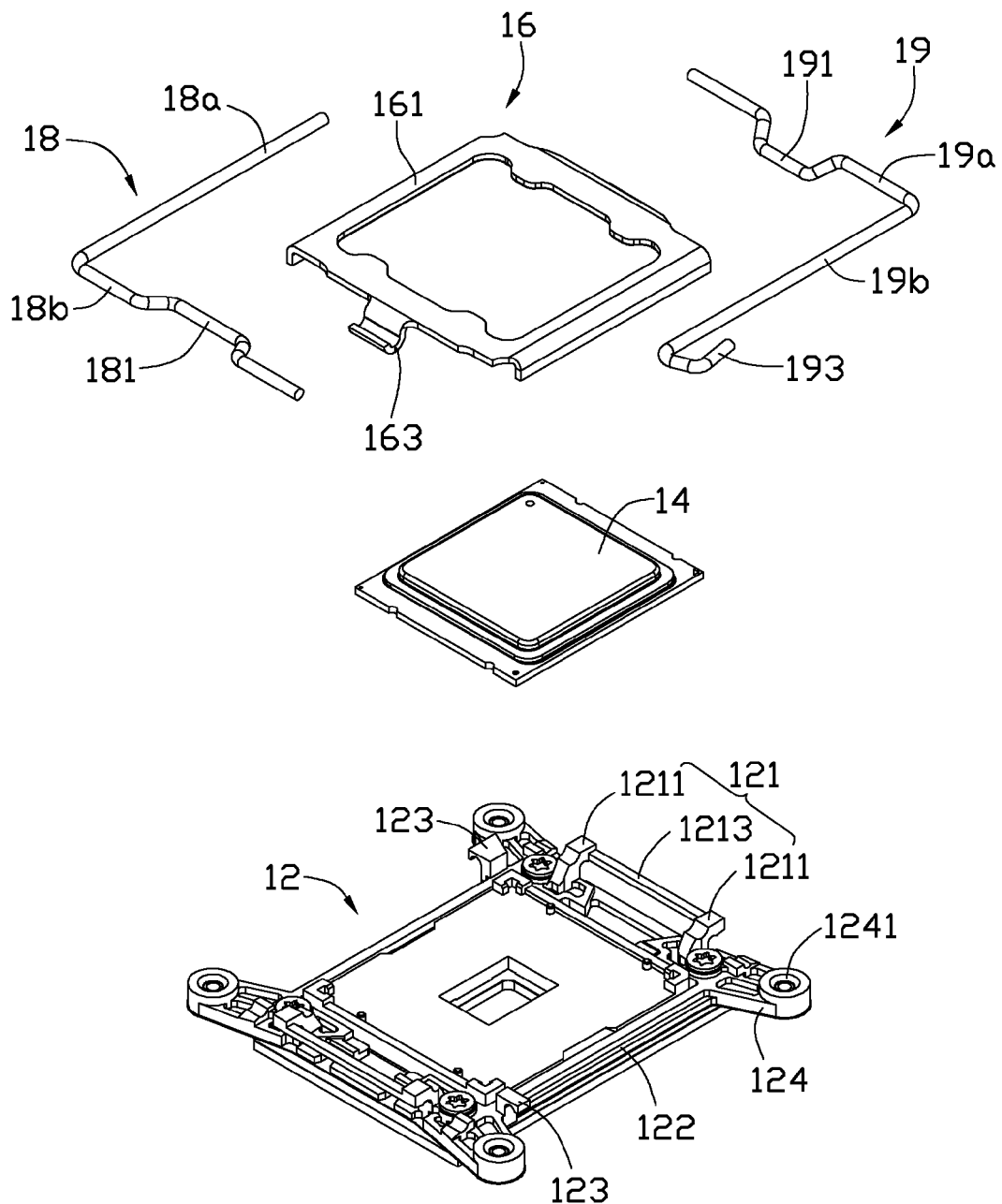
FIG. 2 is an exploded view of a first CPU module of FIG. 1.

Referring to FIG. 2, the first CPU module 10 includes a base 12, a CPU 14, a mounting frame 16, a first securing rod 18, and a second securing rod 19. The base 12 has a square-shaped main body 122 and four tabs 124 extending from the four corners of the main body 122. A securing hole 1241 is defined in each of the tabs 124 for mounting a heat sink. A pair of resisting arms 121 extends from each side of the main body 122. Each of the pair of resisting arms 121 includes a pair of protruding blocks 1211 extending upwards and outwards from the main body 122 and a connecting rod 1213 connected between the pair of protruding blocks 1211. A pair of resisting blocks 123 extends upwards from positions adjacent to two diagonally opposite corners of the main body 122. An arc-shaped notch (not labeled) is defined in the distal ends of each of the resisting blocks 123. The mounting frame 16 includes a main frame 161 and a pair of bent pieces 163 extending from opposite sides of the main frame 161. The main frame 161 has a square-shape. In one embodiment, each one of the first securing rod 18 and the second securing rod 19 is a bent metal rod, shaped so that the two rods when fitted in place encompass the main frame 161 almost completely. The first securing rod 18 includes a first section 18a and a second section 18b extending substantially perpendicularly from the first section 18a. The second section 18b includes a first protruding portion 181. The second securing rod 19 includes a first segment 19a and a second segment 19b extending substantially perpendicularly from the first segment 19a. The first segment 19a includes a second protruding portion 191. An L-shaped handle 193 extends from a distal end of the second segment 19b. The second CPU module 110 has the same structure as the first CPU module 10.

Figure 3:
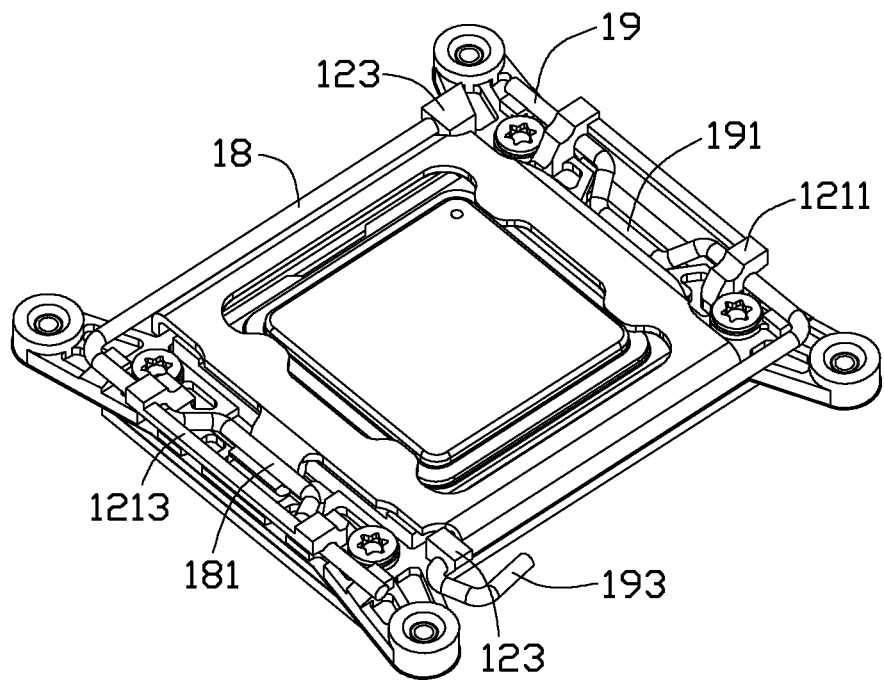
FIG. 3 is a view of the assembled first CPU module of FIG. 2.
Figure 4:
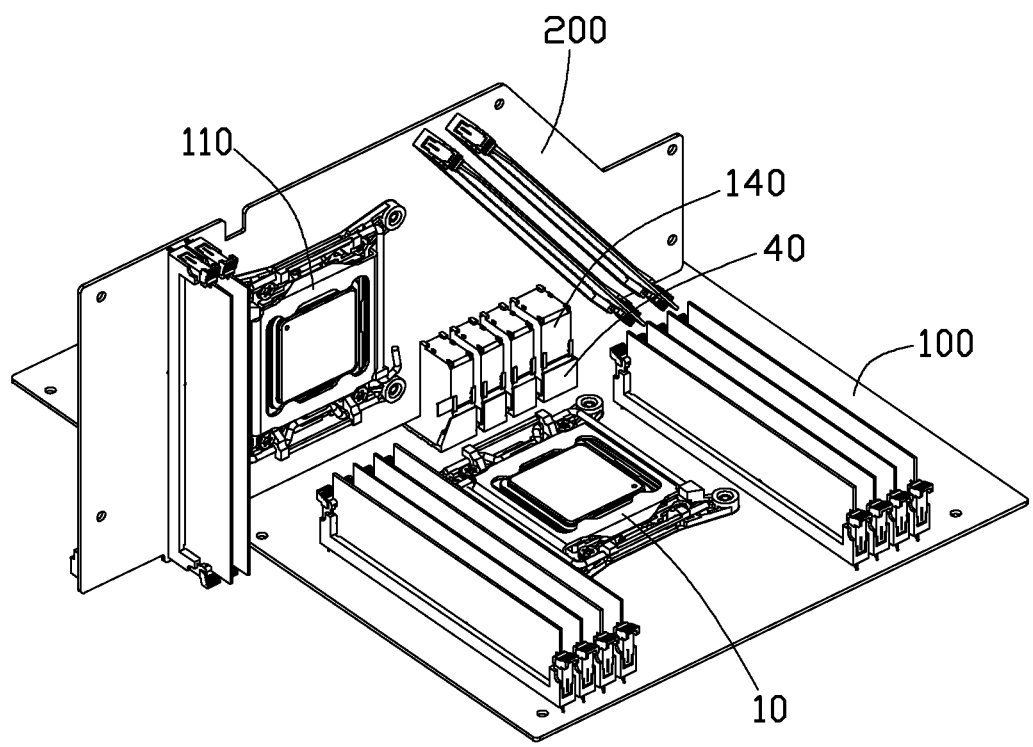
FIG. 4 is a view of the assembled computing device of FIG. 1.

Referring to FIGS. 3 and 4, in assembly, the base 12 is secured on the first motherboard 100. The CPU 14 is mounted on the base 12. The mounting frame 16 is mounted on the CPU 14. The first section 18a is engaged in the notch of one of the pair of resisting blocks 123. The second section 18b abuts one of the pair of resisting arms 121. The first segment 19a abuts the other pair of resisting arms 121. The second segment 19b is engaged in the notch of the other one of the pair of resisting blocks 123. The first protruding portion 181 and the second protruding portion 191 abut the pair of bent pieces 163. The mounting frame 16 presses down tightly on the CPU 14. The CPU 14 is thus securely mounted on the base 12.

In disassembly of the first CPU module 10, the first section 18a is pressed downwards and disengages from one of the pair of resisting blocks 123. The second section 18b disengages from the pair of resisting arms 121. The handle 193 is pressed downwards. The second segment 19b disengages from the other one of the pair of resisting blocks 123. The first segment 19a disengages from the other pair of resisting arms 121. The first protruding portion 181 and the second protruding portion 191 disengage from the pair of bent pieces 163, unlocking the mounting frame 16 and allowing the removal of the CPU 14 from the base 12.

When the computing device needs two CPUs, the plurality of slave connectors 140 is connected to the plurality of master connectors 40. The second motherboard 200 is attached perpendicularly to the first motherboard 100. In one embodiment, the plurality of first PCI cards 30 is perpendicular to both the first motherboard 100 and the second motherboard 200. The first group of the plurality of second PCI cards 130 is obliquely oriented relative to the first motherboard 100. The first CPU module 10 and the second CPU module 110 can work cooperatively and improve the data processing ability of the computing device. If only one CPU is needed, the second motherboard 200 can be quickly detached from the first motherboard 100. If more than two CPUs are needed, a plurality of slave motherboards can be attached to the first motherboard 100.

While the present disclosure has been illustrated by the description in this embodiment, and while the embodiment has been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A computing device comprises:
a first motherboard comprising a first CPU module and a plurality of first peripheral component interconnect (PCI) sockets; wherein the first CPU module comprises a base mounted on the first motherboard, a CPU mounted on the base, and a mounting frame mounted on the CPU; the first CPU module further comprises a first securing rod and a second securing rod, the base abuts the first securing rod and the second securing rod, and the first securing rod and the second securing rod abut the mounting frame; and a pair of resisting arms is located at a first pair of opposite sides of the base, a pair of resisting blocks is located at a second pair of opposite sides of the base, and the first securing rod and the second securing rod abut rear sides of the pair of resisting arms and the pair of resisting blocks;
a second motherboard, substantially perpendicularly attached to the first motherboard, comprising a second CPU module and a plurality of second PCI sockets;
wherein the plurality of first PCI sockets is located perpendicularly to both of the first motherboard and the second motherboard; and the plurality of second PCI sockets comprises at least one PCI socket that is obliquely oriented relative to the first motherboard.

2. The computing device of claim 1, wherein the first motherboard comprises at least one master connector, and the second motherboard comprises at least one slave connector connected to the at least one master connector.

3. The computing device of claim 2, wherein the first motherboard has a rectangular shape, a first lengthwise slot is defined in each of the plurality of first PCI sockets along a first direction that is substantially parallel or perpendicular to an edge of the first motherboard; and a second lengthwise slot is defined in the at least one PCI socket along a second direction that is obliquely oriented relative to a lengthwise edge of the second motherboard.

4. The computing device of claim 1, wherein each of the pair of resisting arms comprises a connecting rod and a pair of protruding blocks connected to opposite ends of the connecting rod.

5. The computing device of claim 4, wherein the mounting frame comprises a main frame abutting the CPU and a pair of bent pieces extending from opposite sides of the main frame, and the first securing rod and the second securing rod abut the pair of bent pieces.

6. The computing device of claim 5, wherein the first securing rod comprises a first section and a second section that is substantially perpendicular to the first section, the second section comprises a first protruding portion abutting a first one of the pair of bent pieces; and the second securing rod comprises a first segment and a second segment that is substantially perpendicular to the first segment, the first segment comprises a second protruding portion abutting a second one of the pair of bent pieces, and an L-shaped handle extends from a distal end of the second segment.

7. A computing device comprises:
a first motherboard comprising a first CPU module and a plurality of first peripheral component interconnect (PCI) sockets, the plurality of first PCI sockets being substantially perpendicular or parallel to an edge of the first motherboard; wherein the first CPU module comprises a base mounted on the first motherboard, a CPU mounted on the base, and a mounting frame mounted on the CPU; the first CPU module further comprises at least one securing rod, the base abuts the at least one first securing rod, and the at least one securing rod abuts the mounting frame; at least one resisting arm is located at a first side of the base, at least one resisting block is located at a second side of the base that is substantially perpendicular to and adjacent to the first side of the base, and the at least one securing rod abuts the at least one resisting arm and the at least one resisting block;
a second motherboard, detachably attached to the first motherboard, comprising a second CPU module and a plurality of second PCI sockets; a lengthwise edge of the second motherboard abutting the first motherboard, and the plurality of the second PCI sockets being obliquely oriented relative to the lengthwise edge.

8. The computing device of claim 7, wherein the first motherboard comprises at least one master connector, and the second motherboard comprises at least one slave connector connected to the at least one master connector.

9. The computing device of claim 7, wherein the at least one resisting block is located adjacent to a corner of the base.

10. The computing device of claim 9, wherein the at least one resisting arm comprises a connecting rod and a pair of protruding blocks connected to opposite ends of the connecting rod.

11. The computing device of claim 10, wherein the mounting frame comprises a main frame abutting the CPU and at least one bent piece extending from the main frame, and the at least one securing rod abuts the pair of bent pieces.

12. The computing device of claim 11, wherein the at least one securing rod comprises a first section and a second section that is substantially perpendicular to the first section, the second section comprises a first protruding portion abutting the at least one bent piece.

13. The computing device of claim 11, wherein the at least one securing rod comprises a first segment and a second segment that is substantially perpendicular to the first segment, the first segment comprises a second protruding portion abutting the at least one bent piece, and an L-shaped handle extends from a distal end of the second segment.

* * * * *